Figures 1, 2:
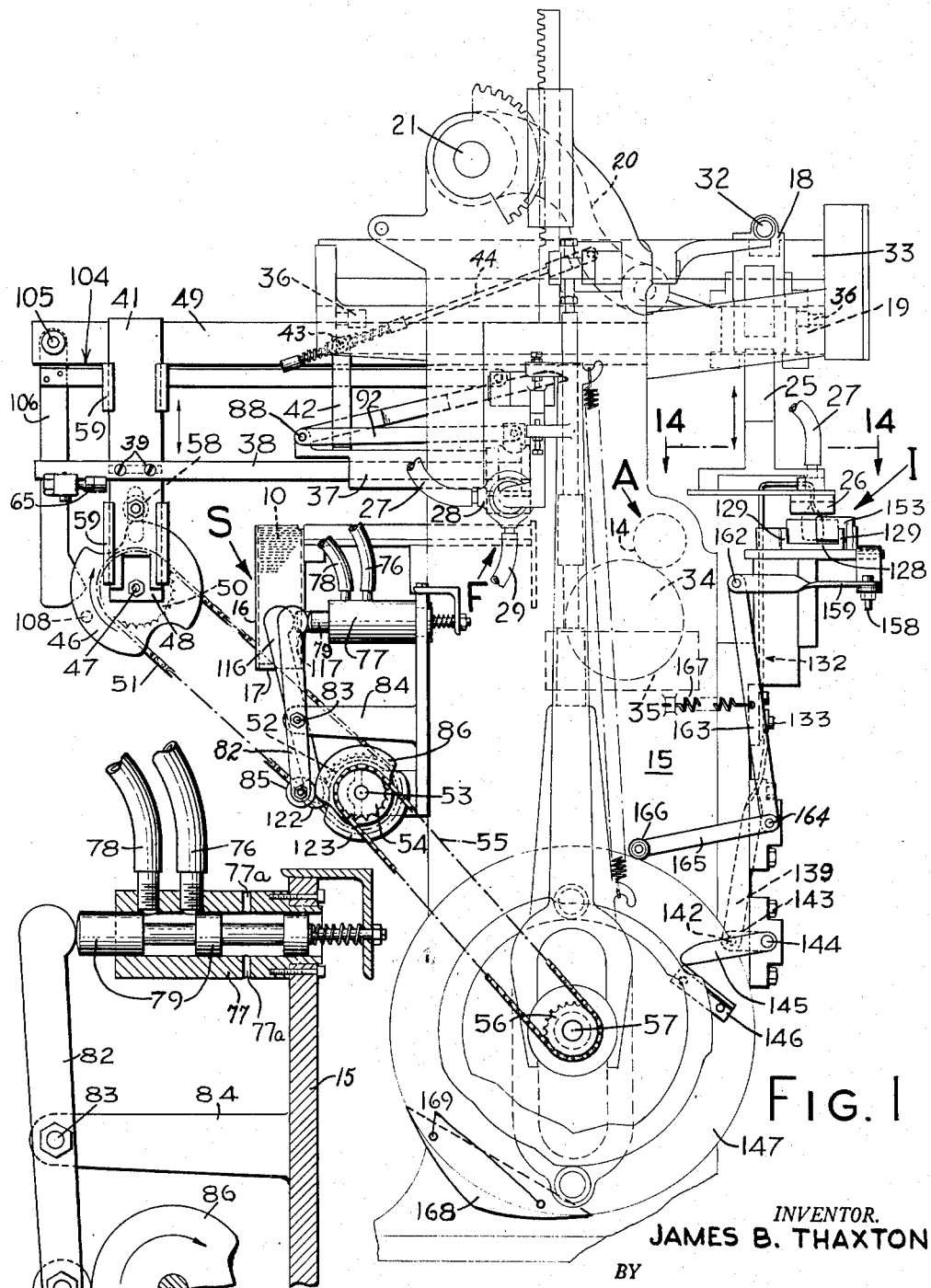

Dec. 30, 1952  J. B. THAXTON  2,623,442
BOX PARTITION FORMING AND INSERTING MACHINE
Filed Oct. 21, 1949  6 Sheets-Sheet 1

INVENTOR.
JAMES B. THAXTON
BY

Dec. 30, 1952  J. B. THAXTON  2,623,442
BOX PARTITION FORMING AND INSERTING MACHINE
Filed Oct. 21, 1949  6 Sheets-Sheet 3

INVENTOR.
JAMES B. THAXTON
BY

Dec. 30, 1952  J. B. THAXTON  2,623,442
BOX PARTITION FORMING AND INSERTING MACHINE
Filed Oct. 21, 1949  6 Sheets-Sheet 4

INVENTOR.
JAMES B. THAXTON

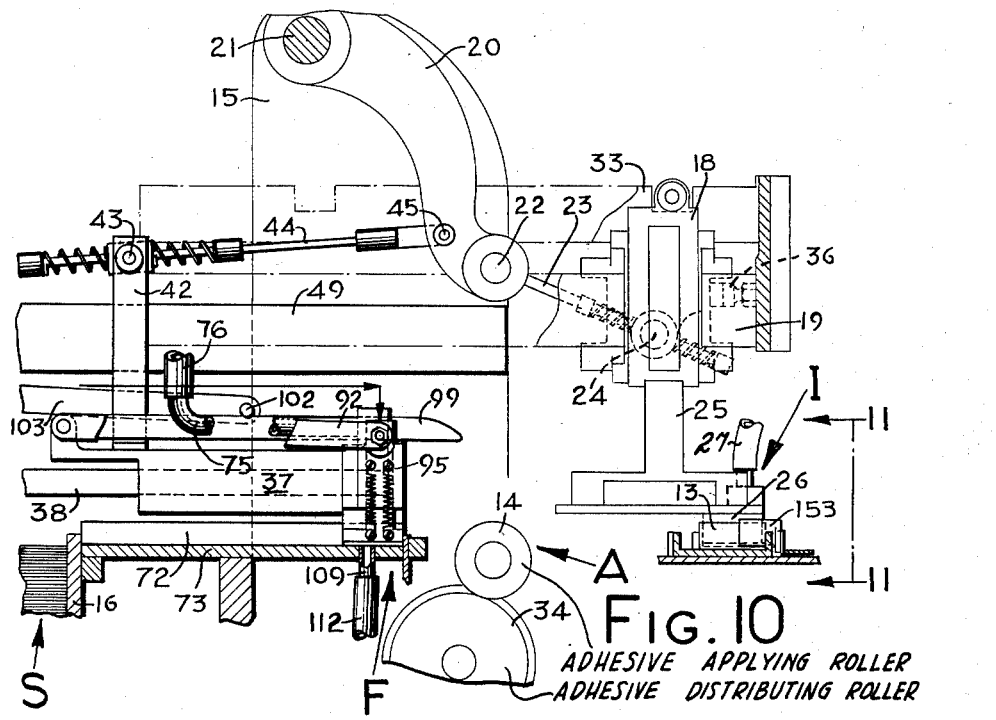
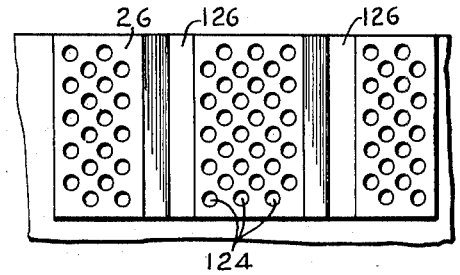
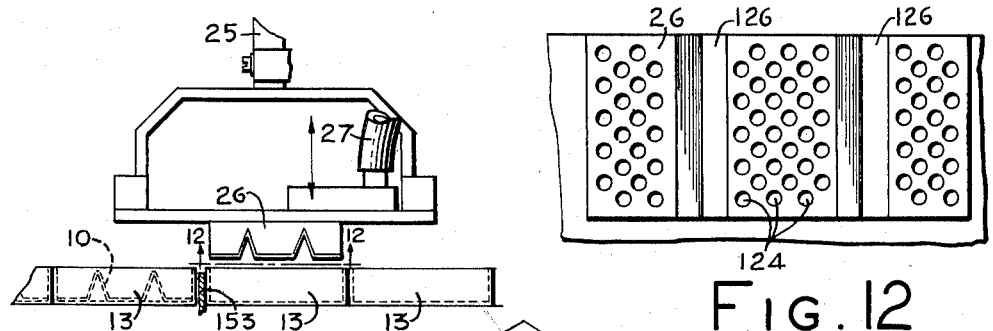
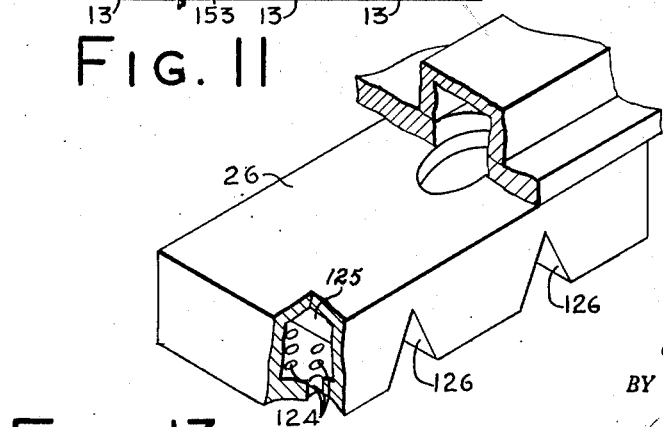

Dec. 30, 1952  J. B. THAXTON  2,623,442
BOX PARTITION FORMING AND INSERTING MACHINE
Filed Oct. 21, 1949  6 Sheets-Sheet 6
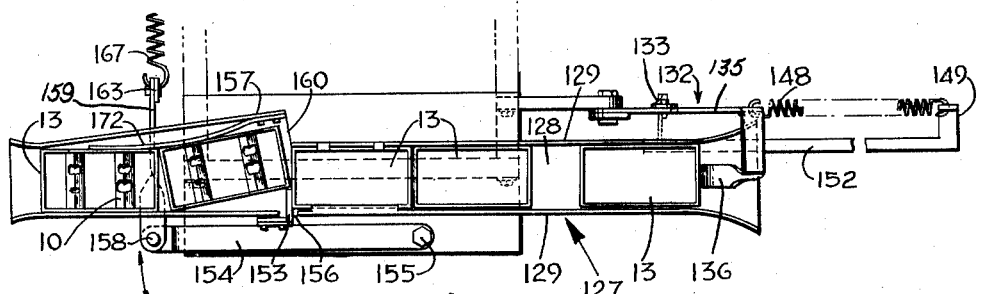
Fig. 14
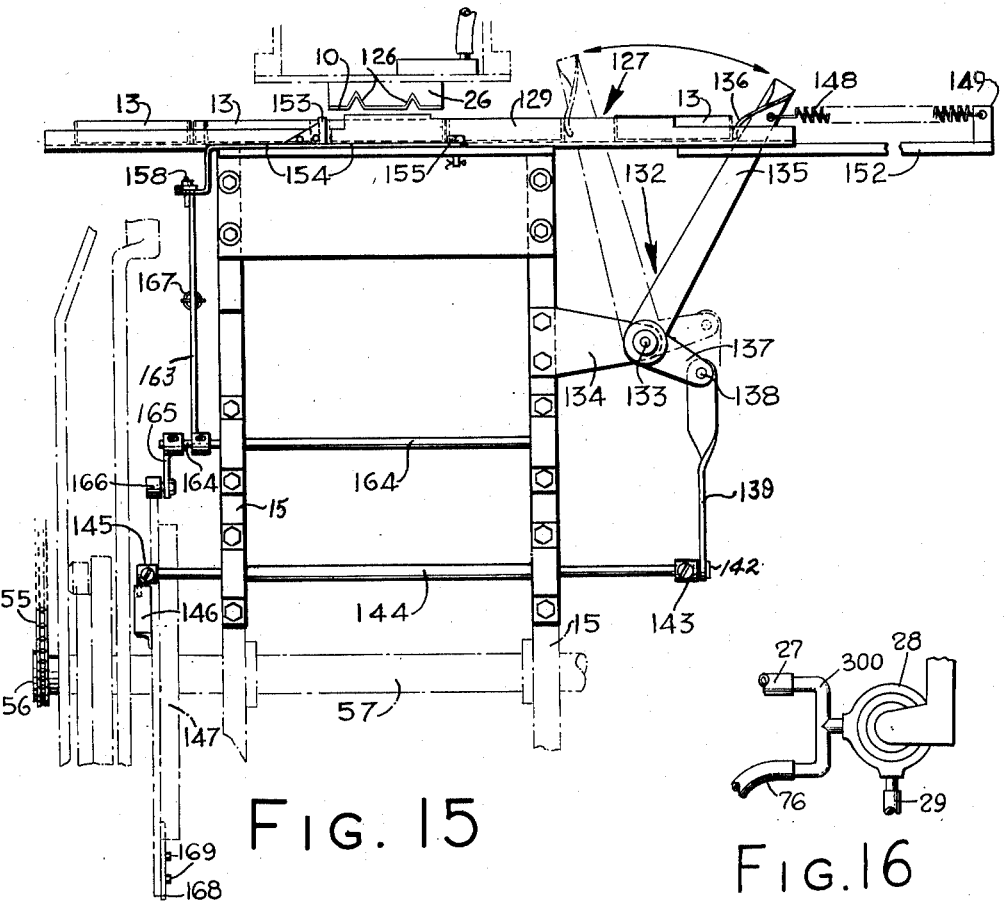
Fig. 15
Fig. 16
INVENTOR.
JAMES B. THAXTON
BY Patented Dec. 30, 1952

2,623,442

UNITED STATES PATENT OFFICE 2,623,442

BOX PARTITION FORMING AND INSERTING MACHINE

James B. Thaxton, Indianapolis, Ind., assignor to Paper Package Company, Indianapolis, Ind., a corporation of Indiana Application October 21, 1949, Serial No. 122,797

10 Claims. (Cl. 93—37)

This invention relates to machines for partitioning boxes or the like, and more particularly to a machine for forming and inserting the formed partitions in boxes.

It is an object of the invention to provide a machine which removes partitions, one by one, from a supply source, forms the removed partition into that shape in which it is to be applied within a box or the like, applies adhesive to selective portions of the partition and inserts the formed, adhesive-coated partition in said box or the like.

It is a further object of this invention to provide a machine of this character which is of relatively simple design and construction whereby box partitions may be preformed and inserted efficiently and uniformly within their respective boxes in rapid succession and without requiring any particularly skilled supervision.

With these and incidental objects in view, the invention comprises certain novel features of construction and combinations of parts, the essential elements of which are set forth in appended claims, and a preferred embodiment of which is hereinafter described with reference to the drawings which accompany and form part of the specification.

Figure 3:
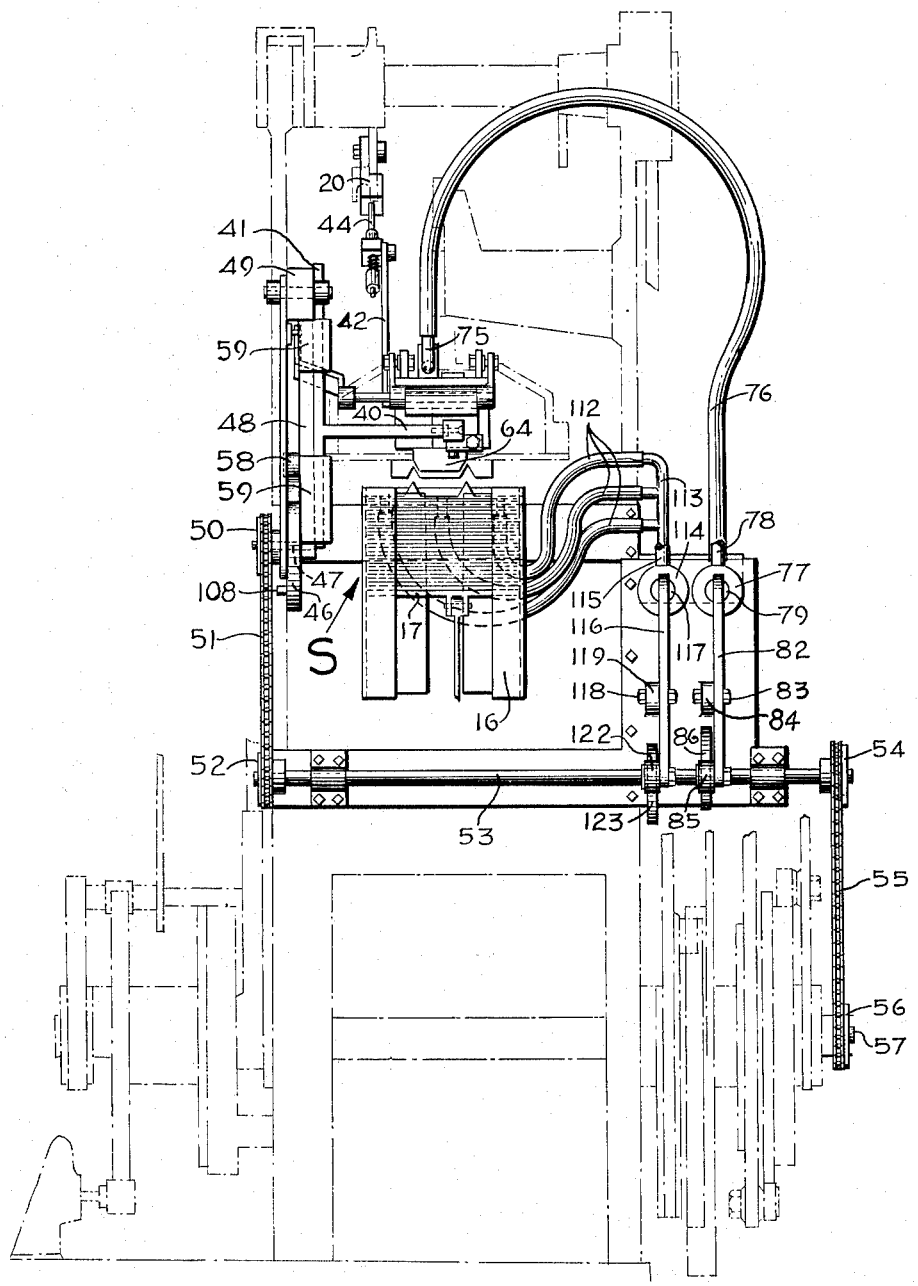
Figure 4:
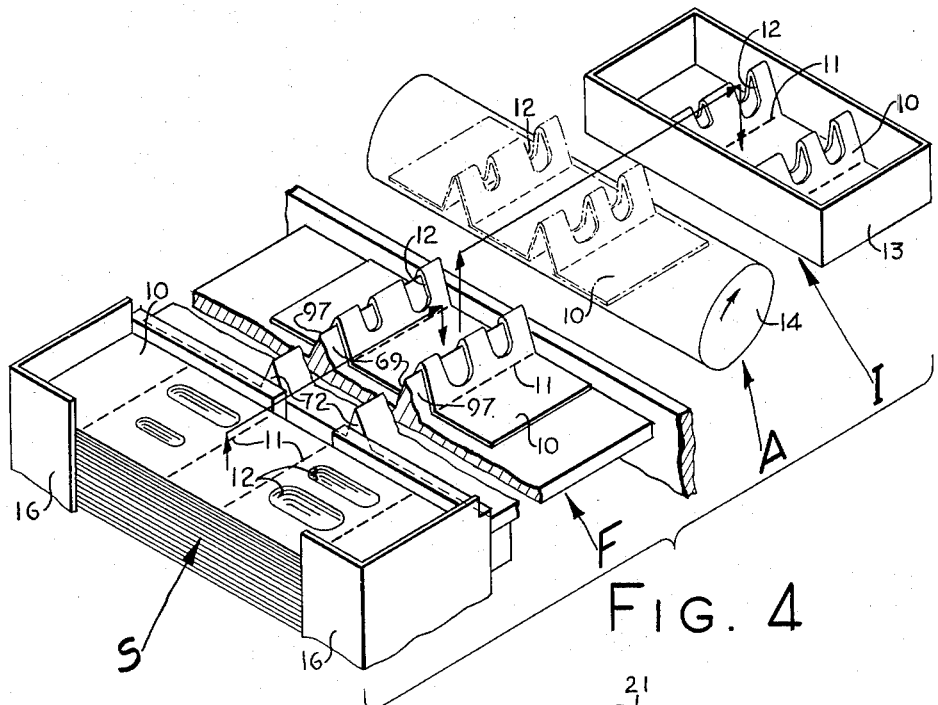
Figure 5:
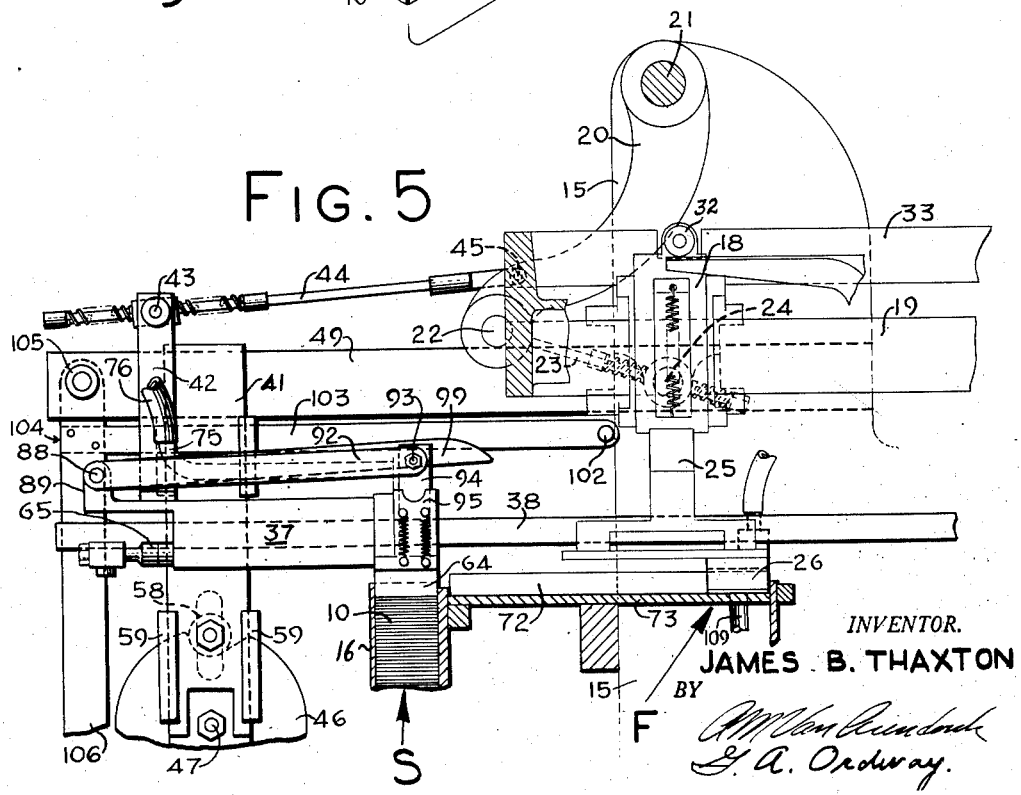

In the drawings:

Fig. 1 is a left side elevation of the machine with the conventional or standard construction shown in lightweight line and the new mechanism shown in heavier weight line, Fig. 2 is a detailed enlarged elevation, partly in section, of certain valve mechanism shown in Fig. 1, Fig. 3 is a fragmentary rear elevation of the machine with conventional parts shown in phantom and the new mechanism shown in full line, Fig. 4 is a diagrammatic perspective view illustrating the sequence of operations of the machine at various operation performing stations, Fig. 5 is an enlarged elevation, partly in section, showing the upper left portion of the machine with the forming head in position to pick up a partition, Fig. 6 is a perspective of the mechanism shown in Fig. 5 with the forming head shown advanced to the forming station, Fig. 7 is a detailed front elevation taken substantially along the line 7—7 of Fig. 6 and showing the position of the forming head in its preliminary forming position at the forming station, Fig. 8 is a detailed sectional elevation taken along the line 8—8 of Fig. 7, Fig. 9 is a detailed sectional elevational taken along the line 9—9 of Fig. 7, Fig. 10 is an enlarged left side elevation, partly in section, of the upper, forward portion of the machine showing the forming head at the end of its forming stroke at the forming station and the partition depositing head inserting a just previously formed partition within a box, Fig. 11 is a detailed front elevation of the depositing head taken substantially along the line 11—11 of Fig. 10, Fig. 12 is a bottom plan view of the depositing head taken along the line 12—12 of Fig. 11, Fig. 13 is a fragmental perspective view of the depositing head, a forward corner thereof being broken away for clearness of illustration, Fig. 14 is a top plan view of the box feeding mechanism taken substantially along the line 14—14 of Fig. 1, certain parts being omitted for clearness, Fig. 15 is a front elevation of said box feeding mechanism, and Fig. 16 is a detailed view showing a modified form of certain hose connections.

It is believed that a preliminary, comprehensive explanation of the successive steps in the machine's function will facilitate and expedite an understanding of the various machine sections and their co-operation in carrying out the objectives of the invention. Toward this end, reference is now made to Fig. 4 wherein the successive operations of the machine are diagrammatically illustrated.

Fig. 4 shows a stack S of box partitions 10 having conventional score lines 11 along which the partitions are to be folded. The particular partitions 10 (shown herein for illustration purposes only) are such as may be used in receptacles for containing hypodermic syringes, ampoules, vials, or the like, there being provided cut-out portions 12 which, when the partitions are formed as shown in the drawings, provide recesses for embracing the articles to hold them securely in fixed position in the box. Such partitions are known in the packaging art as reversible partitions. In operation, the machine picks up the terminal partition from the top of stack S at the rear of the machine and moves the partition forwardly to a forming station F, where the partition is formed into the shape necessary for it to serve its intended purpose, and insertion into the box or other receptacle 13. From the forming station F the partition is moved forwardly of the machine past an adhesive applying station A, where a roller 14 applies adhesive to presented portions of the undersurface of the partition while it is in transit toward box 13. Following its pasage over adhesive applying roller 14, the partition is inserted within box 13 at an inserting station I.

For the purpose of illustrating and describing the novel features thereof, the partition forming and depositing mechanism is herein shown as installed in a labeling machine such as is disclosed in United States Patent No. 2,227,816 issued to G. W. von Hofe on January 7, 1941. It is to be understood however, that while this labeling machine is of a type for which the box partition forming and depositing mechanism is especially designed, this is in no sense intended to restrict the field of usefulness of said mechanism and that the latter may be readily adapted for efficient combination with other types of labeling or similar machines.

Referring to Fig. 1, the illustrated machine comprises a supporting frame 15 on which a suitable hopper 16 is supported in any convenient manner. Hopper 16 is arranged to contain a supply of partitions 10 in the form of a stack S resting upon the bottom 17 of said hopper 16 as illustrated in Fig. 1. As is customary in labeling machines of the type shown, the bottom 17 is vertically movable upwardly at intervals determined by the progressively diminishing height of the stack due to the removal of successive partitions 10 therefrom. The purpose of the aforesaid upward movement of the bottom 17 is to periodically restore the upper end of the stack of partitions 10 to a predetermined level. The means for progressively elevating the stack S, may be such as are shown in the aforementioned von Hofe Patent No. 2,227,816, or may be of any form suitable to accomplish periodic, incremental upward movement of the stack. It is also noted that hopper 16 is mounted further rearwardly of the machine frame 15 than is the label supply hopper disclosed in the aforementioned von Hofe Patent No. 2,227,816, a forming station F occupying substantially the same position in the present machine as was occupied by the label containing hopper of the machine disclosed in the von Hofe patent.

The formed partitions are adapted to be removed successively from the forming station F and transferred forwardly of the machine past an adhesive applying station A into position at an inserting station I. The partition transferring means is of the suction operated type, and includes a carriage 18 slidably mounted upon a horizontal guide rail 19 secured upon the frame 15 in any convenient manner. Carriage 18 is arranged to be slidably reciprocated on rail 19 in any well-known way and in proper synchronism with the other parts of the machine, as for instance by means of an arm 20 (see also Fig. 5) fixed upon a shaft 21 suitably journaled on frame 15. The free end of arm 20 is pivotally connected as at 22 with a coupling rod 23 which in turn is pivotally and yieldingly connected as at 24 to carriage 18.

The mechanism whereby shaft 21 is rocked on its axis to swing arm 20 and thereby effect the reciprocation of carriage 18 on rail 19 may be such as is clearly shown in Fig. 1 herein. The operation of this mechanism is fully disclosed in von Hofe Patent No. 2,227,816.

Carriage 18 supports a member 25 capable of vertical reciprocation thereon and provided at its lower end with a partition-inserting, suction head 26 later to be described in detail. A suction hose 27 connects head 26 with a control valve 28 from which there extends an additional hose 29 connecting the valve with a suitable source of suction. The operation of valve 28 and the hose connections 27 and 29 just described are similar to and operate in the same manner as the counterpart valve and hose connections disclosed in the aforementioned von Hofe patent.

Member 25 is vertically movable on carriage 18 at one end of the reciprocation thereof to pick up a formed partition 10 from the forming station F and, at the other terminal of said reciprocation to insert the picked up partition within a box 13 or other receptacle at inserting station I. During the movement of carriage 18 from the forming station F to inserting station I, member 25 is held against downward movement in carriage 18 by means of a roller 32 which travels along a fixed rail 33 recessed at proper points to permit the desired downward movement of the member 25 and with it the depositing head 26. Any suitable mechanism may be provided for operating member 25 and head 26 in vertical directions, such as for instance the mechanism herein illustrated in Fig. 1, the operation of which is described in detail in the von Hofe Patent No. 2,227,816.

In the instant machine the partitions successively picked up by depositing head 26 at the forming station F are provided with a coating of adhesive on portions of their lower surfaces during the transfer of said partitions from forming station F to inserting station I. For the purpose of applying said coating to successive partitions 10, the machine includes adhesive applying means consisting for instance, of the aforementioned adhesive applying roller 14 suitably mounted in the machine in tangential receiving relation to a suitably mounted adhesive distributing roller 34 (rollers 14 and 34 being also designated by legend in Fig. 10) which dips into a supply of adhesive in a container 35 fixed to the machine frame. The applying roll 14 is so located that a partition 10 carried by depositing head 26 will pass into progressive tangential engagement with said roll 14 during the travel from forming station F to inserting station I, the arrangement being such that during the return stroke of carriage 18, depositing head 26 is elevated and thus passes over and above said applying roll 14 and accordingly will not engage the same.

Adjustable stops such as 36 (Figs. 1 and 10) similar to a stop 66 shown in enlarged scale in Fig. 9 and adjustable in the same manner as said stop 66 are affixed on the machine frame adjacent guide rail 19. Stops 36 limit the extent of fore and aft movement of carriage 18 and thus vertically align head 26 with a box 13 at inserting station I at the end of the forward stroke of carriage 18 and with a partition 10 at forming station F at the end of the rearward stroke of the carriage.

The mechanism for picking up partitions 10 from hopper 16 and transferring them to and forming them at forming station F will now be described. Referring to Figs. 1 and 6, this mechanism comprises a carriage 37 mounted for sliding movement fore and aft of the machine upon a horizontal guide rail 38 secured as by screws 39 to a horizontal projecting arm 40 formed integrally with a vertically disposed sliding member 41. An upstanding arm 42 provided on carriage 37 is pivotally and yieldingly connected as at 43 with a coupling rod 44, which in turn is pivotally connected as at 45 to the rock arm 20. Hence, as arm 20 rocks to and fro as previously described, carriage 37 is reciprocated forwardly and rearwardly along guide rail 38. Carriage 37, rail 38, and member 41 are arranged to be raised and lowered as a unit by means of a cam 46 secured to one end of a horizontally disposed stub shaft 47 journaled in a bracket 48 dependingly supported from a horizontally disposed bar 49 fixed to the machine frame.

Referring to Fig. 3, the outer end of shaft 47 has affixed thereon a sprocket 50 meshing with a driven chain 51 which passes around a sprocket 52 affixed on a horizontally disposed shaft 53 suitably journaled on the machine frame. The opposite end of shaft 53 has affixed thereon a sprocket 54 around which passes a drive chain 55 which also passes around a sprocket 56 secured on the main drive shaft 57 of the machine. In this manner shaft 47 is continuously driven in rotation while the machine is operating and thus imparts rotative movement to cam 46. A cam roller 58 affixed adjacent to the lower end of member 41 engages the periphery of cam 46, and due to the configuration of the latter as shown in Fig. 6, rotation thereof alternately raises and lowers members 41, rail 38, and carriage 37, member 41 being guided for vertical movement in ways 59 formed on bracket 48.

The forward end of carriage 37 is provided with a forming head 64 (Fig. 7) of the suction operated type and, by the mechanism just described, carriage 37 with its forming head 64 is moved fore and aft of the machine synchronously with the fore and aft movements of carriage 18 and its inserting head 26. The raising and lowering of rail 38 and carriage 64 by cam 46 is so timed that forming head 64 is lowered into pick-up position with respect to the terminal partition of the stack S at the same time that inserting head 26 is picking up a formed partition 10 from forming station F. Similarly, forming head 64 is raised by cam 46, moved forward by carriage 37, and then lowered by cam 46 synchronously with the corresponding movements of inserting head 26, so that forming head 64 will place a partition 10 into forming position at forming station F concurrently with the deposition by inserting head 26 of a previously formed partition within a box 13.

An adjustable stop 65 (adjustable in the same manner as a stop 66 shown in detail in Fig. 9) affixed to rail 38 adjacent its rear end (Fig. 5) serves to limit the extent of rearward movement of carriage 37 and to arrest the carriage in such position that forming head 64 is in alignment with partitions 10 of stack S at the end of the rearward stroke of carriage 37. Similarly, an adjustable stop 66 (Fig. 9) secured as by a screw 67 to the forward end of rail 38 serves to arrest carriage 37 and forming head 64 in precise vertical alignment at forming station F at the end of the forward stroke of carriage 37.

Forming head 64 is provided with bevelled side walls 68 (Fig. 7) that are arranged to enter between correspondingly angled side walls 69 of upstanding inverted V-shaped projections 72 formed on a bed plate 73, suitably secured in the machine frame. There is provided just sufficient clearance between the surfaces of forming head 64 and the upper surfaces of bed plate 73 and side walls 69 of projections 72 to accommodate the thickness of a partition 10 when head 64 is moved into its lowermost forming position with respect to bed plate 73 as shown in Fig. 7. The lower face of forming head 64 is provided with a series of relatively small apertures 74 entering into a chamber 74a provided internally of the head, said chamber communicating with a nipple 75 secured to head 64 as shown in Figs. 8 and 9.

A suction hose 76 (Fig. 3) attached to nipple 75 connects head 64 with a control valve 77 (best shown in Fig. 2) from which extends an additional hose 78 connecting the valve with a suitable source of suction. Valve 77 is suitably secured to frame 15 as shown in Fig. 2 and includes a spring-pressed plunger 79 slidably mounted therein. The outer end of plunger 79, under the compression of its spring, bears against an arm 82 fulcrumed as at 83 to an outwardly projecting bracket 84 secured to the machine frame. The lower end of arm 82 has mounted thereon a roller 85 which, under the compression of the plunger spring, bears against a cam 86 affixed to shaft 53 (see also Fig. 3). In the position shown in Fig. 2, valve 77 is open, i. e., suction is supplied to head 64 by virtue of hose line 78 being permitted to communicate with the suction head line 76 as shown in this figure. Rotation of cam 86 controls the opening and closing of valve 77 in such timed relation with the movement of head 64 that when the latter is in contact with a terminal partition of stack S, suction is present within head 64 to pick up said terminal partition. The suction is maintained during the travel of the head upwardly, forwardly, and then downwardly into forming position at forming station F, whereupon at approximately the completion of the downward movement, the suction is shut off by virtue of cam 86 having rotated a distance sufficient to cause arm 82 to move plunger 79 into a position where valve 77 is closed, i. e., a position where hose line 78 is blocked from communication with head line 76 and the latter is simultaneously placed in communication with atmosphere by means of a port 77a provided in valve 77 to thereby release said terminal partition. The suction remains shut off in head 64 during its return stroke to stack S and until such time as head 64 is moved downwardly into contact with the next terminal partition of stack S, whereupon valve 77 is again actuated to open the suction line to the head and simultaneously close port 77a.

It will be understood that the control valve just described is for illustrative purposes only and may be any one of several types of valves suitable to accomplish the described purpose. For instance, the control valve could be of the same type as valve 28 associated with partition inserting head 26 and disclosed in the aforementioned von Hofe patent. Moreover, if desired, hose 76 may, instead of being connected to independent valve 77, be connected along with hose 27 to valve 28 by means of a T connection 300 as shown in Fig. 16 so that valve 28 would control the suction flow in both the inserting head 26 and the forming head 64.

Referring to Fig. 7, it is seen that as forming head 64 moves downwardly into forming position between projections 72 of plate 73, the central portion only of a partition 10 is thrust downwardly between the projections, thus only such portion of the partition is depressed into the space between the inverted V-shaped projections 72 and against their side walls 69 as clearly shown in this figure. This leaves the two outer ends 87 of partition 10 extending in a horizontal plane in parallel spaced relation from the upper surfaces of bed plate 73 as shown in full lines in Fig. 7 and remaining to be formed. The mechanism for depressing these ends downwardly about the outer angular sides 97 of projections 72 to the dotted line position shown in Fig. 7 to complete the forming of the partition will now be described.

Referring to Figs. 5 and 6 a horizontally disposed shaft 88 is journaled in an upstanding bearing 89 provided on the rear end of carriage 37. Adjacent the opposite ends of bearing 89 there are fixed to shaft 88 a pair of forwardly extending arm 92 pivotally connected at their forward ends as at 93 to the upper ends of a pair of vertically disposed, slidably mounted, forming members 94. Members 94 are guided for vertical movement in ways 95 formed on the forward end of carriage 37. The lower ends of members 94 are bevelled as at 96 (Fig. 7) to correspond with the outer, angular sides 97 of projections 72. Springs such as 98 connected at their lower ends to members 94 and at their upper ends to ways 95 normally urge members 94 and their associated arms 92 upwardly into the position shown in Fig. 5. The inner end of shaft 88 (Fig. 6) has affixed thereto a forwardly and slightly upwardly projecting lever 99 which, when carriage 37 is in its forward or forming position, is arranged to engage an inwardly projecting stud 102 secured on one arm 103 of a bell crank 104 pivoted as at 105 to the rear end of bar 49. The opposite, depending arm 106 of bell crank 104 has formed on its lower end a node 107 arranged to be engaged by an outwardly projecting stud 108 secured on one side of cam 46. Upon engagement of node 107 by stud 108, bell crank 104 moves clockwise (as viewed in Fig. 6) about pivot 105 an amount sufficient to cause stud 102 to depress lever 99 which, in turn, rocks shaft 88 to move arms 92 downwardly, whereby members 94 are thrust downwardly to that position shown in full lines in Fig. 6 and also shown in dotted lines in Fig. 7. Downward movement of members 94 causes their bottoms to engage ends 87 of the partition 10 and press same downwardly, thus completing the forming of the partition. The engagement of node 107 by stud 108 to impart the downward thrust of members 94 as just described, occurs substantially concurrently with or slightly after forming head 64 reaches its lowermost position between projections 72 as shown in Fig. 7.

The formed partition 10 is held in formed position upon bed plate 73 by suction means now to be described. A series of tubes 109 (Figs. 7, 8 and 9) extend upwardly through bed plate 73 in vertical alignment with head 64 when the latter occupies its forward or forming position shown in Figs. 6 and 10, the tubes being disposed adjacent the oppositely inclined sides 69 and 97 of projections 72. The upper ends of the tubes terminate flush with the upper surface of plate 73 and their lower ends are connected by separate flexible tubes 112 to a common suction hose 13 (Fig. 3) extending upwardly from a control valve 114, similar to and mounted adjacent valve 77 on the machine frame. An additional hose 115 connects valve 114 with a suitable source of suction.

Referring to Figs. 1 and 3, it is seen that an arm 116 similar to arm 82 has its upper end engaging a plunger 117 of valve 114. Arm 116 is likewise fulcrumed intermediate its ends as at 118 to an outwardly projecting bracket 119 secured to the machine frame. The lower end of arm 116 has mounted thereon a roller 122 which, under the compression of a spring (not shown, but similar to the spring shown in association with plunger 79 of valve 77) associated with the valve plunger 117, bears against a cam 123 fixed to shaft 53 adjacent cam 86. The valve mechanism just described functions in the same manner as the valve mechanisms 77, 79, 82, 85 and 86 associated with forming head 64, cam 123 being arranged to actuate valve 114 during rotation of shaft 53 so that suction is turned on in bed plate 73 just prior to the descent of forming head 64 into forming engagement therewith as shown in Fig. 7. Suction remains on in bed plate 73 to hold the formed partition in formed position flat agaist the plate until such time as the inserting suction head 26 is lowered into engagement therewith, whereupon as the suction is turned on in head 26 by valve 28, the suction is turned off in plate 73 by valve 114.

Referring to Figs. 11, 12 and 13, the partition-inserting head 26 comprises a rectangularly shaped block as clearly shown in Fig. 13, the block being of such size and shape as to fit with just sliding clearance within the particular box 13 or other receptacle in which a partition 10 is to be inserted. The lower surface of head 26 is provided with a series of apertures 124 communicating with a chamber 125 formed interiorly of the head. As previously described, hose 27 connects chamber 125 with suction control valve 28. Inverted V-shaped recesses 126 extending in parallel spaced relation from the front to the rear are provided in the under surface of the head to permit the latter to accommodate the corresponding upstanding, inverted V-shaped projections 72 of bed plate 73. Consequently, when head 26 is moved to forming station F and moved downwardly to pick up a formed partition 10 from bed plate 73, the under surfaces of the head lie in intimate contact with all portions of the upper surfaces of the partition 10.

The mechanism for feeding boxes 13 or other receptacles to inserting station I and for registering the boxes in proper position with respect to inserting head 26 at this station will now be described.

Referring to Figs. 1, 14 and 15, the boxes are placed, one by one, in the right-hand end of a channel indicated generally at 127. Channel 127 is formed with a bottom 128 and two upstanding sides 129 of a height corresponding to the height of boxes 13, the width between upstanding sides 129 likewise corresponding substantially with the width of boxes 13. A bell crank indicated generally at 132 and pivoted at 133 to a bracket 134 secured to the machine frame has an upstanding arm 135 formed at its upper end with a pusher blade 136 extending into the space between side walls 129 and bottom 128 of channel 127. The opposite arm 137 of bell crank 132 is pivoted at 138 to a depending link 139, the lower end of which is pivoted as at 142 (Fig. 1) to a relatively short link 143 fixed to the right-hand end of a horizontally disposed shaft 144, suitably journaled at the front of the machine on frame 15. The left end of shaft 144 has fixed thereon an inwardly projecting arm 145, the innermost end of which lies in the path of an angle plate 146 secured to one side of a cam disk 147 secured for rotation with the main drive shaft 57 of the machine. A spring 148 (Figs. 14 and 15) connected at one end adjacent the upper end of arm 135 and at its opposite end to a lug 149 of a bracket 152 fixed to the under side of channel 127, tensions bell crank 132 to the position shown in full lines in Fig. 15, that is, with pushing blade 136 in its extreme right-hand position as viewed in this figure. At appropriate times in the machine cycle, angle plate 146 engages arm 145 and cams it upwardly. Upward movement of arm 145 rocks shaft 144 in a clockwise direction as viewed in Fig. 1 and, through links 143 and 139, swings bell crank 132 in a counterclockwise direction (as viewed in Fig. 15) about its pivot 133 against the tension of spring 148, from the position shown in full lines to the position shown in dotted lines therein. Such an extent of movement of pusher blade 136 is sufficient to advance a previously inserted box 13 into engagement with another previously inserted box 13 lying within channel 127 and to advance the latter into position against a box registering stop 153 which serves to position the box in precise, vertical alignment with head 26 as clearly shown in Fig. 15. As soon as angle plate 146 has passed beyond the forward end of arm 145 the parts 136, 139, etc., are restored to their normal positions under the tension of spring 148.

Stop 153 is secured to an arm 154 pivoted as at 155 to the machine frame. As clearly shown in Fig. 14, in its normal position stop 153 projects inwardly through a slot 156 provided in the forward side 129 of channel 127 and extends into the path of travel of boxes 13 within the channel. It is here noted that the rear wall 129 of channel 127 is cut away at that point lying directly opposite stop 153 and that adjacent this point the rear wall 129 of the channel is formed angularly as at 157 providing a space 160 in the channel that is wider than the normal width thereof for a purpose to be later described. The free end of arm 154 is pivoted at 158 to one end of a link 159, which link has its opposite end pivoted as at 162 to the upper end of an arm 163. The lower end of arm 163 is fixed to a horizontally disposed shaft 164 suitably journaled on the machine frame 15. The outer left end of shaft 164 has fixed thereto an inwardly projecting arm 165 which carries on its innermost end a cam roller 166. A spring 167 connected to arm 163 and anchored at its opposite end to the machine frame normally tensions stop 153, through the connections just described, to its innermost or box-engaging position shown in Figs. 1 and 14, and also maintains roller 166 in contact with the periphery of disk 147. It will be understood that cam disk 147 is a standard component of labeling machines of the type disclosed in the aforementioned von Hofe patent. However, a cam 168 peculiar to the present machine is secured to cam disk 147 as by screws 169, said cam being arranged to engage roller 166 during the rotation of disk 147 by shaft 57. At appropriate times in the machine cycle, cam 168 engages roller 166 and, by means of arms 165 and 163, link 159 and arm 154, removes stop 153 from the path of movement of boxes 13 in channel 127. The timing is such that stop 153 is withdrawn from the path of the boxes immediately following the inserting of a partition 10 in the box, whereupon pusher blade 136 is operated to advance the next adjacent box 13 into inserting position. The said next adjacent box 13 will follow the box 13 in which a partition has just been inserted toward the left as viewed in Fig. 14, and concurrently with this box reaching a position where its rear end lies opposite slot 156, stop 153 is released by cam 168 and restored to its inner or effective box-stopping position under the tension of spring 167. Incident to the restoration of stop 153 as just described it engages the rear end of the box 13 which was just advanced from beneath head 26 and pushes it askew into the space 160 toward the angularly disposed upstanding wall of channel 127 as clearly shown in Fig. 14, and arrests the movement of the next adjacent box 13. A flat leaf spring 172 affixed to the inner surface of wall 157 yieldingly presses the forward end of the removed box against the forward wall 129 of the channel 127, in the manner shown in Fig. 14. By this spring 172 the boxes are restrained from sudden ejecting movement to the left in channel 127. From the channel the boxes may be fed into any suitable container (not shown).

It will be understood of course, that the movements of pusher blade 136 and stop 153 just described are synchronized with each other and with the movements of inserting head 26 so that partitions 10 are, in rapid succession, inserted in the boxes 13, as the latter are rapidly, synchronously, and successively advanced to inserting station I.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

I claim:

1. In a machine for forming and inserting partitions in boxes, a supply stack of box partitions, a suction type forming head, a forming plate associated therewith, a suction type inserting head, means for advancing and registering boxes in alignment with said inserting head, means for synchronously reciprocating said heads respectively between said supply stack and said forming plate and the latter and said box registering means, valve mechanism connected to a source of suction and associated with said heads and said forming plate, said valve mechanism being operable to control the suction applied to said partitions by said heads and said plate whereby the partitions are removed successively from said supply stack by said forming head to said forming plate and formed and held formed thereat, then removed therefrom and maintained in formed condition by said inserting head and inserted in a box held in registration by said box registering means.

2. A machine for forming and inserting partitions in boxes comprising a holder for a supply of partitions, a forming plate spaced therefrom and having a configuration such as to impart the desired formation to a partition, a box supporting means spaced from said forming plate, a reciprocable partition-forming suction head having a surface shaped in correspondence with the configuration of said forming plate and arranged to ply between said partition supply holder and said plate, a reciprocable partition-inserting suction head in tandem with said forming head also having a surface shaped in correspondence with the configuration of said plate and arranged to ply between said plate and said box supporting means, controlled suction means associated with said heads and said plate and operable therewith to remove a partition from said supply holder, form and hold said removed partition on said forming plate, remove the formed partition from said plate, maintain said partition in formed condition and insert said formed partition within a box on said box supporting means.

3. In a machine of the class described, a supply of box partitions, a plate contoured to impart a desired formation to said partitions, a suction head complementally contoured and adapted to co-operate with said forming plate to conform a partition therebetween, said head being reciprocable to transfer a partition from said supply into conforming position with respect to said plate, a support for a box mounted in spaced relation from said forming plate, and a second suction head synchronously reciprocable with said first-mentoned head and adapted to transfer a formed partition from said plate to a box and to insert said formed partition therein.

4. In a machine of the class described, a supply of box partitions, a plate contoured to impart a desired formation to said partitions, a suction head complementally contoured and adapted to co-operate with said forming plate to conform a partition therebetween, said head being reciprocable to transfer a partition from said supply into conforming position with respect to said plate, a support for a box mounted in spaced relation from said forming plate, a second suction head synchronously reciprocable with said first-mentioned head and adapted to transfer a formed partition from said plate to a box and to insert said formed partition therein, and means for applying adhesive to certain portions of a formed partition during its transit from said forming plate to said box.

5. In a machine for forming and inserting partitions in boxes, a supply of partitions, a support located at a point of insertion at a distance from said supply for supporting a box in partition receiving position, a forming station including a plate upon which the partitions are formed located between said partition supply and said point of insertion, an adhesive applying roller located between said partition forming station and said point of insertion, a suction head for removing individual partitions from said supply and having a face thereof that contacts the partitions contoured conformably to said forming plate, means for shifting said suction head to move a partition carried thereby into forming engagement with said plate, a second suction head for removing individual formed partitions from said plate and having a face thereof contoured to retain the partitions in formed position, means connecting said second suction head with the shifting means of said first-mentioned suction head effective to move a formed partition carried by said second suction head transiently into contact with and past said adhesive applying roller to said point of insertion, and means associated with said suction head for effecting insertion of said formed and adhesively coated partition into said box.

6. In a machine for forming and inserting partitions in boxes, a suction plate having spaced upstanding partition-forming projections, a suction head having a central portion movable into forming position between said projections to press a central portion of a said partition between the inner surfaces of said projections into a partially formed suction-held position on said plate, members slidably mounted on opposite sides of said central portion of said head operable to press the outer ends of said partition into completely formed suction-held position on said plate, a second suction head having a surface conformed to fit said formed partition operable to remove said partition from said plate and insert said partition in a box, and means for synchronously moving said suction heads into and out of cooperative association with said suction plate.

7. In a machine of the class described, a supply of box partitions, a plate adapted to receive said partitions for forming, a first suction means operable to remove a terminal partition from said supply and to form said removed partition on said plate, a supply of boxes, means for advancing said boxes individually into partition-receiving position, a second suction means conformed to fit said formed partition and operable to remove the latter from said plate and to insert said formed partition within a box advanced to partition-receiving position, means joining said first and second suction means, and means for imparting reciprocating movement to said joining means.

8. In a machine of the class described, a supply stack of box partitions, a box support spaced therefrom, a box on said support, a partition forming plate intermediate said box support and said supply stack, and a pair of synchronously and reciprocably movable suction heads substantially conforming in shape to said forming plate and simultaneously operable respectively, to remove a terminal partition from said supply stack and a formed partition from said plate and simultaneously and respectively transfer and deposit said removed terminal partition and said formed partition on said plate and in said box.

9. In a machine of the class described, a supply stack of box partitions, a box support spaced therefrom having a box thereon, a partition forming plate intermediate said box support and said supply stack, a pair of synchronously and reciprocably movable suction heads substantially conforming in shape to said forming plate and simultaneously operable respectively to remove a terminal partition from said supply stack and a formed partition from said plate and simultaneously and respectively transfer and deposit said removed terminal partition and said formed partition on said plate and in said box, and means for feeding and registering boxes, one after another, into partition-receiving position on said support.

10. In a box partition forming and inserting machine, means for conveying a partition from one terminal position over a predetermined path to another terminal position and for inserting said partition in a box at said latter position, means including said conveying means as a part thereof operable to bend and form said partition at a point in said path intermediate said terminal positions, and means for applying adhesive to a surface of said partition following said bending and forming operation and before inserting said formed partition in a box at said other terminal position.

JAMES B. THAXTON.

REFERENCES CITED

The following references are of record in the file of this patent:

UNITED STATES PATENTS

| Number | Name | Date |
| --- | --- | --- |
| 1,912,733 | Simmons | June 6, 1933 |
| 1,947,610 | McNamara | Feb. 20, 1934 |
| 1,337,803 | Deline | Dec. 28, 1943 |
| 2,397,582 | Watt | Apr. 2, 1946 |
| 2,454,556 | Hirst | Nov. 23, 1948 |
| 2,472,441 | Schmitt | June 7, 1949 |